(12) United States Patent
Chou (10) Patent No.: US 6,922,030 B2
(45) Date of Patent: Jul. 26, 2005

(54) ADJUSTABLE IRIS-DIAPHRAGM CONTROLLER (75) Inventor: Yen-Jung Chou, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 10/798,585

(22) Filed: Mar. 10, 2004

(65) Prior Publication Data
US 2005/0083001 A1 Apr. 21, 2005

(30) Foreign Application Priority Data
Oct. 15, 2003 (TW) ........................ 92128593 A (51) Int. Cl.[7] .............. G03B 9/06; H02P 6/08
(52) U.S. Cl. .............. 318/254; 318/610; 318/619; 318/626
(58) Field of Search .............. 318/138, 254, 318/439, 609–611, 615, 619, 621, 626, 632, 720–724

(56) References Cited

U.S. PATENT DOCUMENTS

| 4,633,357 | A | * | 12/1986 | Kinjo | 360/136 |
| 4,842,387 | A | * | 6/1989 | Murakami et al. | 359/698 |
| 5,241,251 | A | * | 8/1993 | Wakui | 318/599 |
| 5,850,277 | A | * | 12/1998 | Dang et al. | 352/214 |
| 6,510,282 | B1 | * | 1/2003 | Ruck et al. | 396/8 |
| 6,710,563 | B2 | * | 3/2004 | Mizumaki et al. | 318/437 |

* cited by examiner

Primary Examiner—Bentsu Ro
(74) Attorney, Agent, or Firm—Townsend and Townsend and Crew LLP (57) ABSTRACT An adjustable iri-diaphragm controller includes a brushless direct current (DC) motor, an iris defining a aperture that corresponds to an angular position of the DC motor, and a control module including a differential circuit, an integrator, and a current-limiting circuit. The differential circuit provides an output voltage corresponding to a difference between a first voltage corresponding to the angular position of the DC motor, and a second voltage corresponding to a reference aperture. The integrator provides an output signal corresponding to the output voltage. The current-limiting circuit limits supply of electric current to the DC motor in accordance with the control output signal, and inhibits the supply of the electric current to stop further rotation of the DC motor when the DC motor is rotated to an angular position corresponding to the reference aperture.

12 Claims, 7 Drawing Sheets

ADJUSTABLE IRIS-DIAPHRAGM CONTROLLER

CROSS-REFERENCE TO RELATED APPLICATION

This application claims priority of Taiwanese application no. 092128593, filed on Oct. 15, 2003.

BACKGROUND OF THE INVENTION

1. Field of the Invention

The invention relates to an adjustable iris-diaphragm controller, more particularly to an adjustable iris-diaphragm controller with a control module for controlling a brushless direct current motor to adjust an aperture defined by an iris.

2. Description of the Related Art

Figure 1:
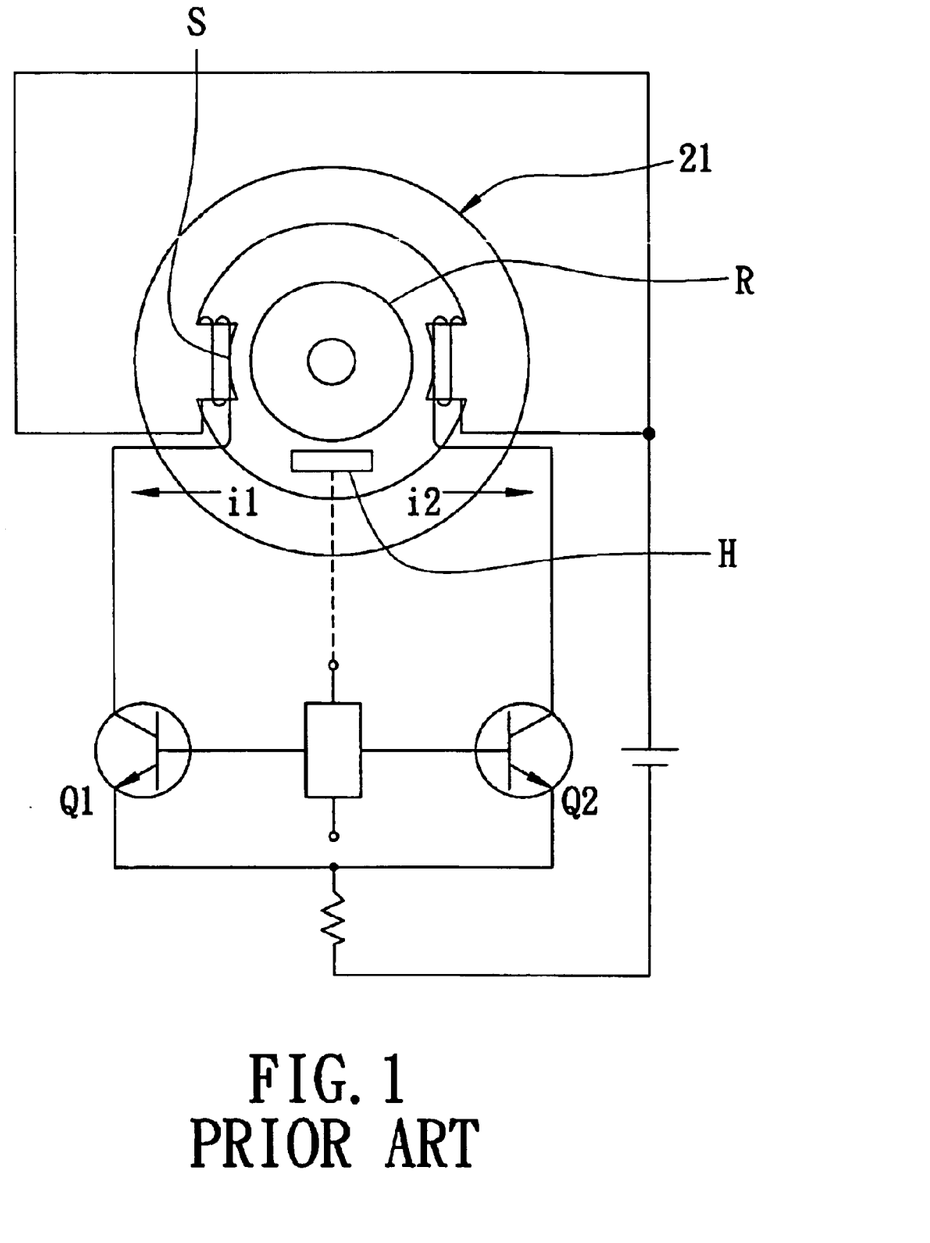
FIG. 1 is a schematic circuit diagram to illustrate a known arrangement of a brushless direct current motor and a Hall sensor.

FIG. 1 illustrates a known arrangement of a brushless direct current (DC) motor 21, and a Hall sensor (H). The DC motor 21 has a rotor (R), and a stator (S) surrounding the rotor (R). The Hall sensor (H) detects the angular position of the rotor (R) of the DC motor 21, and is disposed adjacent to the rotor (R). First and second transistors (Q1, Q2) are coupled electrically to the Hall sensor (H) and the stator (S).

In operation, when the south pole of the rotor (R) is proximate to the Hall sensor (H), the Hall sensor (H) generates a relatively large output voltage sufficient to activate the first transistor (Q1). The activation of the first transistor (Q1) causes the flow of current (i1) through the stator (S), which results in counterclockwise rotation of the rotor (R). On the other hand, when the north pole of the rotor (R) is proximate to the Hall sensor (H), the Hall sensor (H) generates a relatively large output voltage sufficient to activate the second transistor (Q2). The activation of the second transistor (Q2) causes the flow of current (i2) through the stator (S) to permit further counterclockwise rotation of the rotor (R).

It is known to employ DC motors, such as stepper and servo motors, to adjust an aperture defined by an iris in an adjustable iris-diaphragm controller. However, these types of DC motors are relatively expensive to implement and require complicated control circuitry.

To the applicant's knowledge, conventional adjustable iris-diaphragm controllers do not use a brushless DC motor due to the lack of an appropriate control module that is relatively inexpensive and that is capable of controlling the brushless DC motor to adjust the aperture defined by the iris to a desired setting within a relatively short period of time.

SUMMARY OF THE INVENTION

Therefore, the object of the present invention is to provide an adjustable iris-diaphragm controller with a control module for controlling a brushless direct current motor to adjust an aperture defined by an iris.

According to the present invention, an adjustable iris-diaphragm controller comprises an aperture-defining unit, a Hall sensor, an aperture-setting unit, a current source, and a control module. The aperture-defining unit includes a brushless direct current (DC) motor, and an iris coupled to and associated operably with the DC motor for defining an aperture that corresponds to an angular position of the DC motor. The Hall sensor is coupled to and is associated operably with the DC motor so as to detect the angular position of the DC motor and to provide a first output voltage corresponding to the angular position detected thereby. The aperture-setting unit is operable so as to set a reference aperture and to provide a second output voltage corresponding to the reference aperture. The current source serves to supply electric current. The control module includes a differential circuit, an integrator, and a current-limiting circuit. The differential circuit is coupled electrically to the Hall sensor and the aperture-setting unit, receives the first and second output voltages, and provides a third output voltage corresponding to the first and second output voltages. The integrator is coupled electrically to the differential circuit, receives the third output voltage, and provides a control output signal corresponding to the third output voltage. The current-limiting circuit is coupled electrically to the DC motor, the integrator, and the current source. The current-limiting circuit receives the control output signal, and limits supply of the electric current from the current source to the DC motor in accordance with the control output signal for adjusting rotational speed of the DC motor.

When the DC motor is rotated to an angular position corresponding to the reference aperture, the current-limiting circuit inhibits the supply of the electric current from the current source to stop further rotation of the DC motor. Accordingly, the aperture defined by the iris is maintained at the reference aperture.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 2:
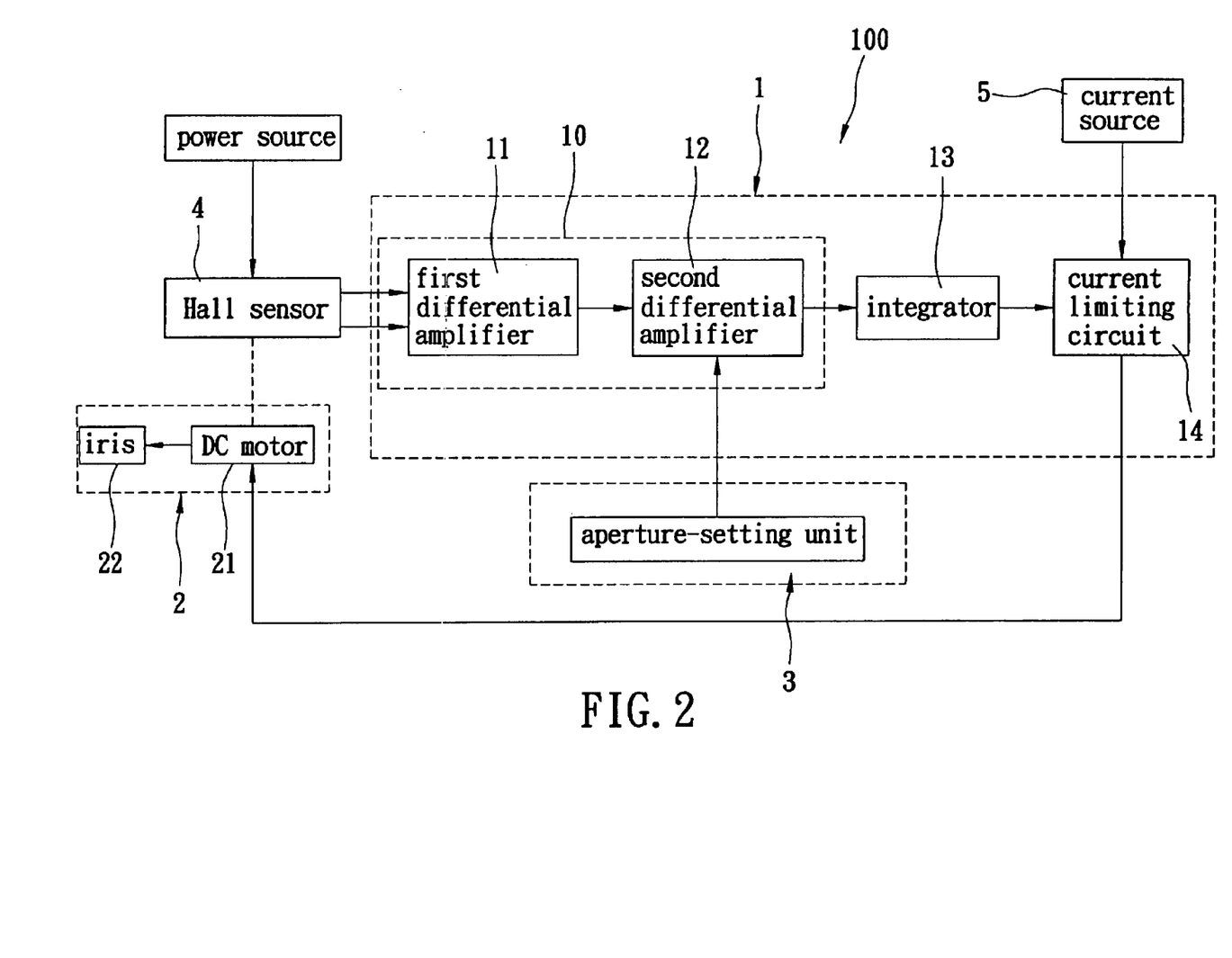
FIG. 2 is a schematic circuit block diagram of the first preferred embodiment of an adjustable iris-diaphragm controller according to the present invention.
Figure 3:
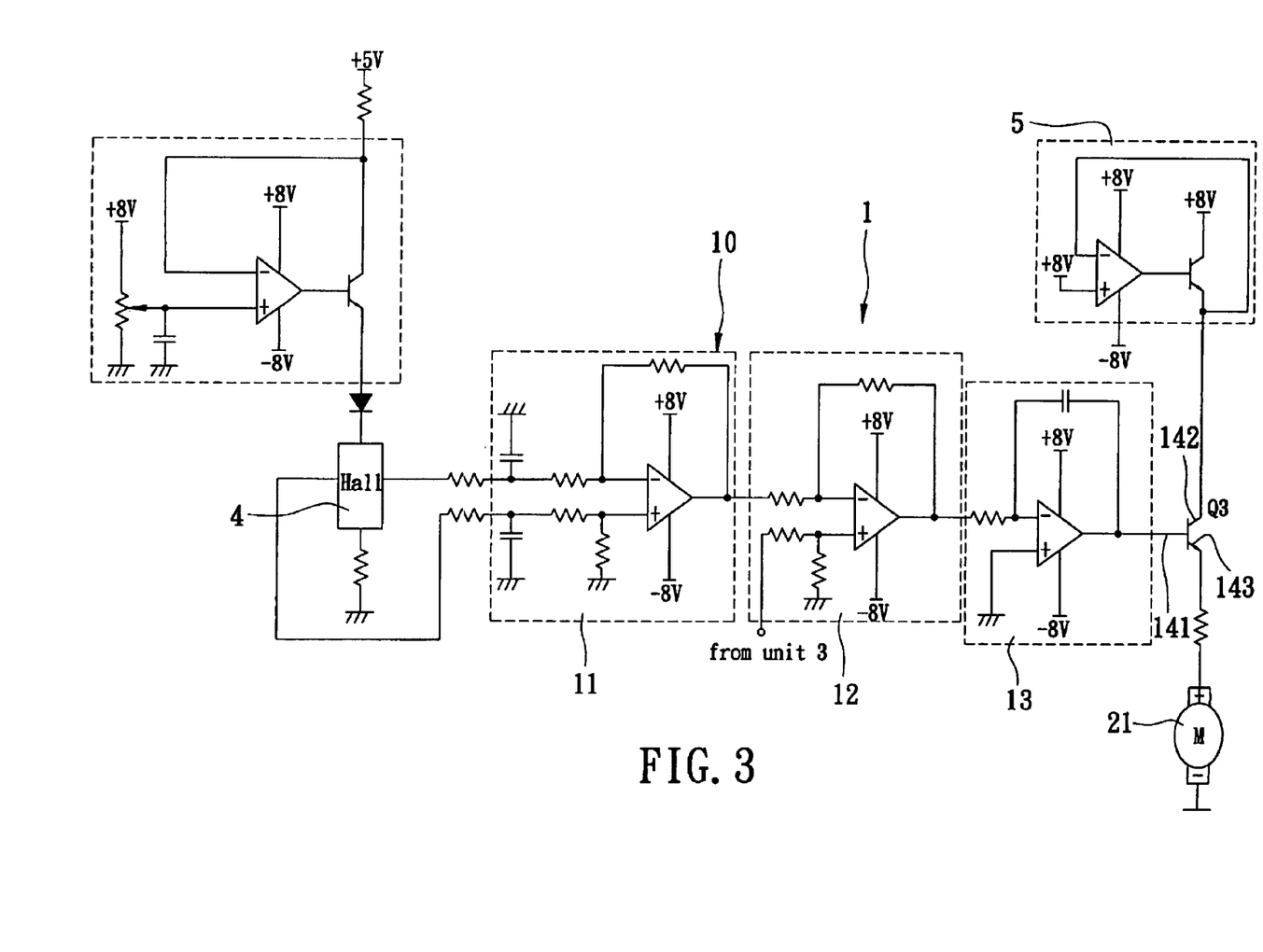
FIG. 3 is a schematic electrical circuit diagram of the first preferred embodiment.

Referring to FIGS. 2 and 3, the first preferred embodiment of an adjustable iris-diaphragm controller 100 according to this invention is shown to include an aperture-defining unit 2, a Hall sensor 4, an aperture-setting unit 3, a current source 5, and a control module 1.

The aperture-defining unit 2 includes a brushless direct current (DC) motor 21, and an iris 22 coupled to and associated operably with the DC motor 21. In this embodiment, the iris 22 defines an aperture 223 (see FIG. 5) that corresponds to an angular position of the DC motor 21.

Figure 4:
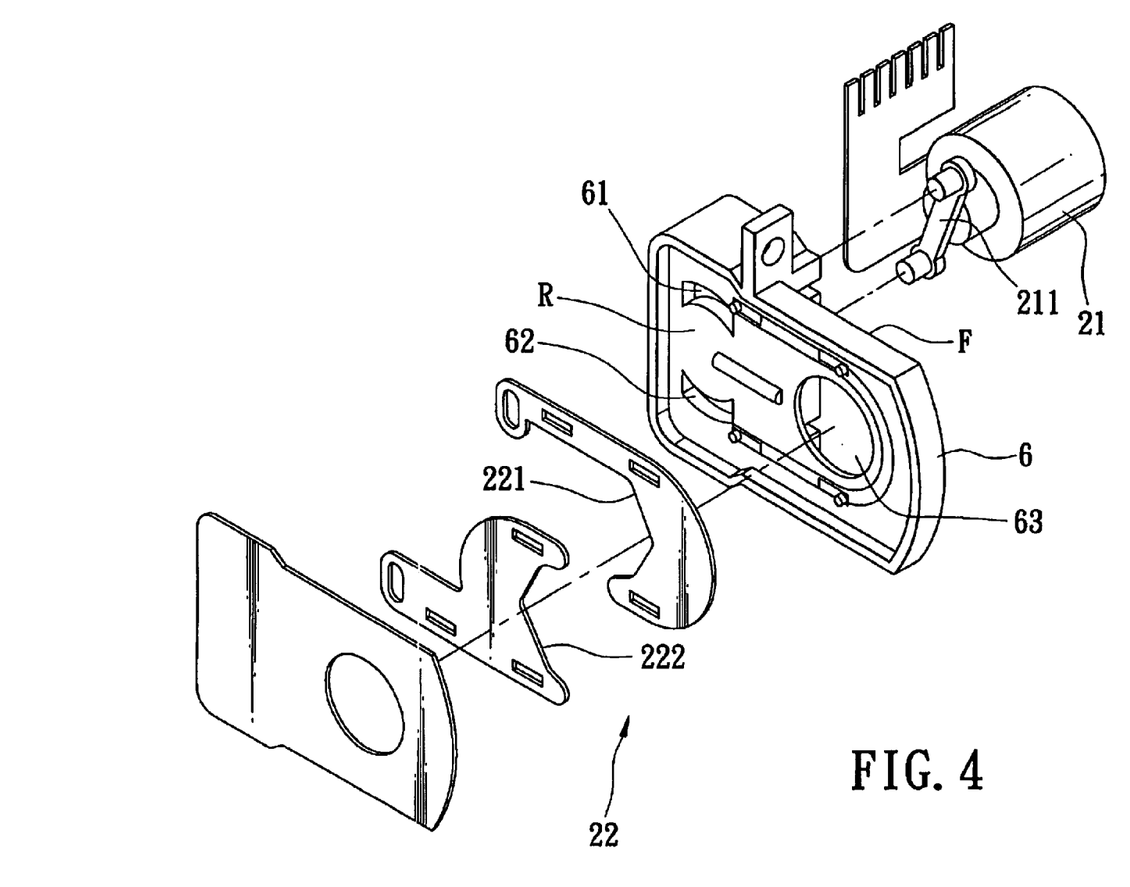
FIG. 4 is an exploded perspective view to illustrate an aperture-defining unit of the first preferred embodiment.
Figure 5:
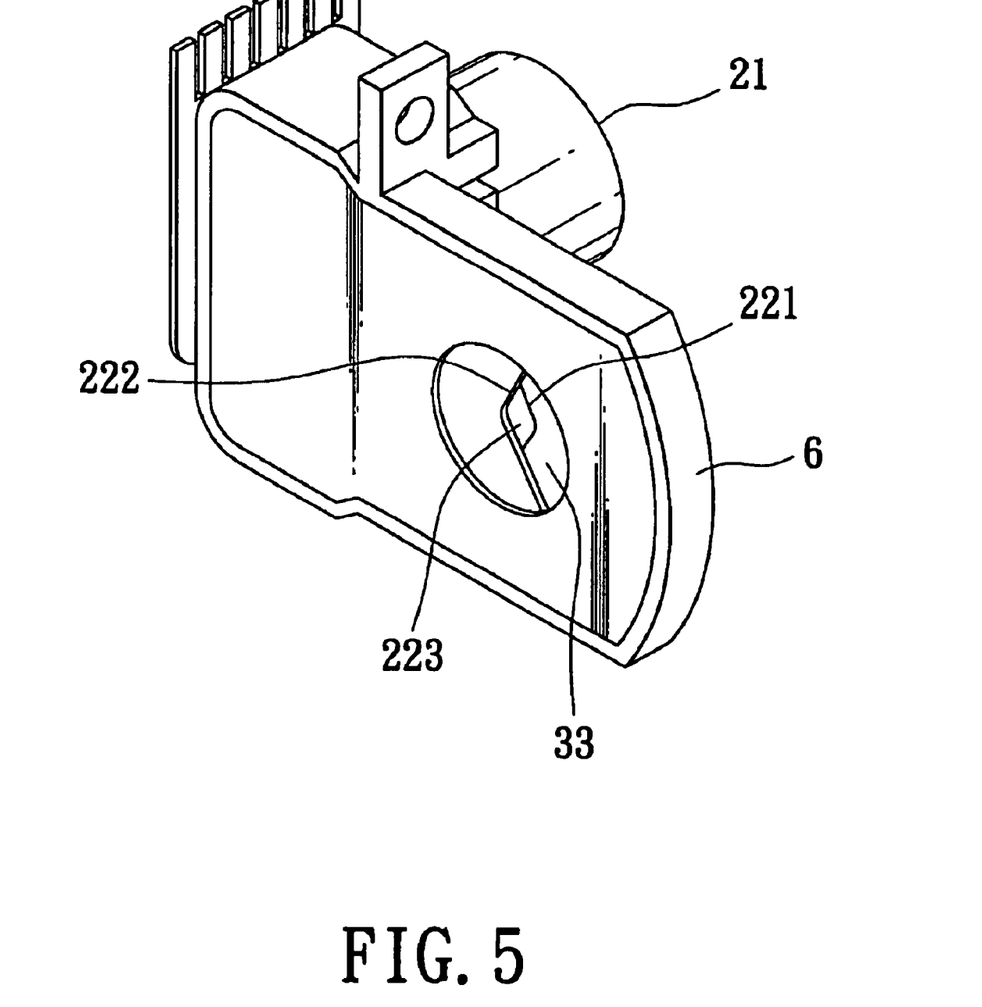
FIG. 5 is a schematic perspective view of the aperture-defining unit in an assembled state.

In particular, with further reference to FIGS. 4 and 5, the adjustable iris-diaphragm controller 100 further includes a housing wall 6 that has opposite first and second surfaces (F, R), a left portion formed with upper and lower curved slots 61, 62 extending through the first and second surfaces (F, R), and a right portion formed with a through hole 63 extending through the first and second surfaces (F, R). The DC motor 21 is disposed on the first surface (F) of the housing wall 6, and includes a crank 211. The crank 211 has first and second ends that extend respectively through the upper and lower curved slots 61, 62 in the left portion of the housing wall 6, and a middle portion that is disposed between the first and second ends and that is coupled co-rotatably to a shaft (not shown) of the DC motor 21. The iris 22 is disposed slidably on the second surface (R) of the housing wall 6, and includes first and second iris leaves 221, 222, each of which has left and right portions. The left portion of each of the first and second iris leaves 221, 222 is connected pivotally to a respective one of the first and second ends of the crank 211 of the DC motor 21. The right portions of the first and second iris leaves 221, 222 overlap to form the aperture 223 that is aligned with the through hole 63 in the right portion of the housing wall 6. Accordingly, rotation of the DC motor 21 in a first direction results in leftward movement of the first iris leaf 221 and in rightward movement of the second iris leaf 222, whereas rotation of the DC motor 21 in a second direction opposite to the first direction results in rightward movement of the first iris leaf 221 and in leftward movement of the second iris leaf 222, thereby adjusting the aperture 223 defined by the iris 22.

Referring again to FIGS. 2 and 3, the Hall sensor 4 is coupled to and is associated operably with the DC motor 21, detects the angular position of the DC motor 21, and provides a first output voltage corresponding to the angular position detected thereby. Since the cooperative action of the DC motor 21 and the Hall sensor 4 is well-known in the art, a detailed description of the same is dispensed with herein for the sake of brevity.

Figure 6:
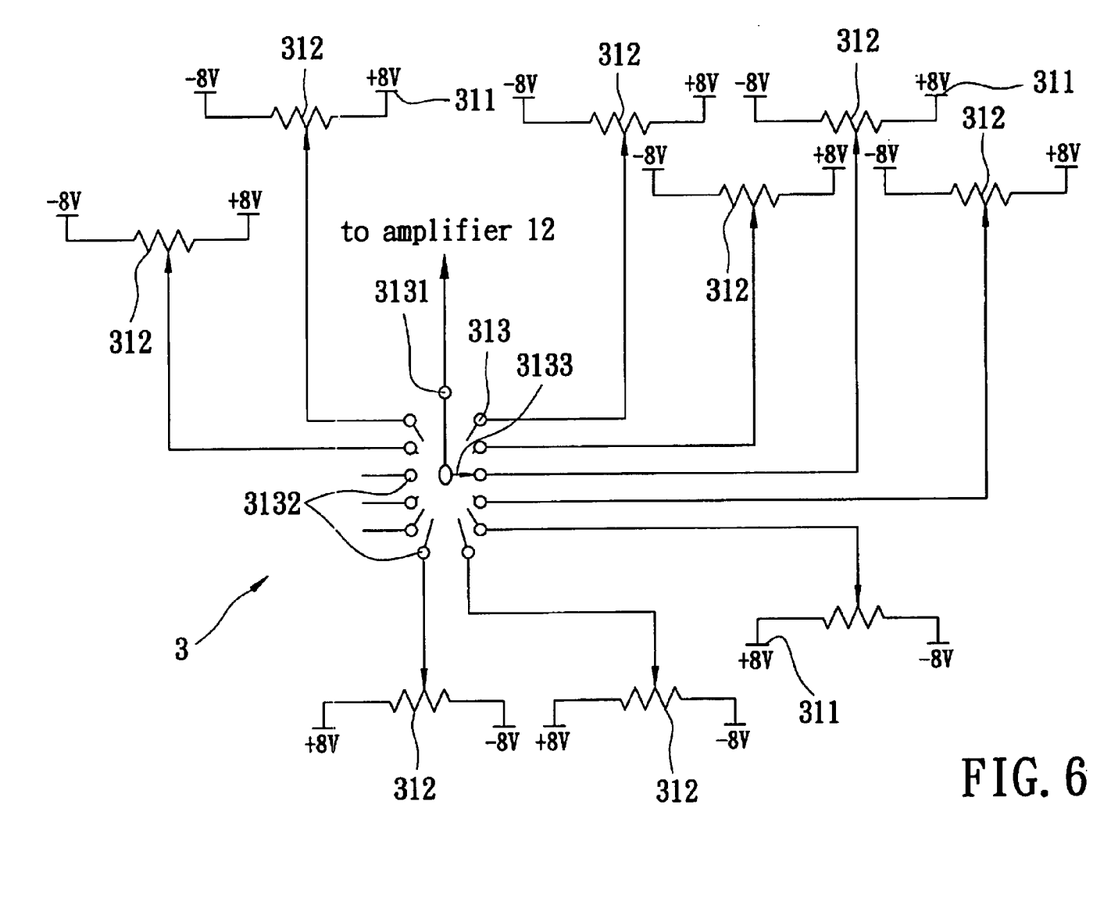
FIG. 6 is a schematic electrical circuit diagram of an aperture-setting unit of the first preferred embodiment.

With further reference to FIG. 6, the aperture-setting unit 3 is operable so as to set a reference aperture and to provide a second output voltage corresponding to the reference aperture. In this embodiment, as best shown in FIG. 6, the aperture-setting unit 3 is a manually operated mechanism that includes a voltage source 311, a plurality of resistors 312, and a manually operable switch 313. Each of the resistors 312 is coupled to the voltage source 311, has an electrical resistance distinct from those of the other ones of the resistors 312, and provides a corresponding voltage drop thereat. The voltage drops of the resistors 312 correspond respectively to predetermined reference apertures. The manually operable switch 313 serves to couple a selected one of the resistors 312 to the control module 1 so that the voltage drop at the selected one of the resistors 312 serves as the second output voltage. The switch 313 is preferably a multi-way switch that includes a first terminal 3131 coupled to the control module 1, a plurality of second terminals 3132 coupled respectively to the resistors 312, and a switch knob 3133 operable so as to connect electrically and selectively one of the second terminals 3132 to the first terminal 3131.

The current source 5 serves to supply electric current.

As best shown in FIGS. 2 and 3, the control module 1 is used to control the aperture-defining unit 2, and includes a differential circuit 10, an integrator 13, and a current limiting circuit 14. In particular, the differential circuit 10 is coupled electrically to the Hall sensor 4 and the aperture-setting unit 3, receives the first and second output voltages therefrom, and provides a third output voltage corresponding to the first and second output voltages. More particularly, the differential circuit 10 includes first and second differential amplifiers 11, 12. The first differential amplifier 11 is coupled to the Hall sensor 4 and is operable so as to receive and amplify the first output voltage. It is noted that the first differential amplifier 11 amplifies the first output voltage by a factor of ten. As such, sensitivity of the control module 1 is enhanced substantially. The second differential amplifier 12 is coupled to the first differential amplifier 11 and the aperture-setting unit 3, and is operable so as to amplify a difference between the first output voltage amplified by the first differential amplifier 11 and the second output voltage from the aperture-setting unit 3 for producing the third output voltage. In an alternative embodiment, the first differential amplifier 11 may be dispensed with. As a consequence, the second differential amplifier 12 is coupled directly to the Hall sensor 4 to receive the first output voltage.

The integrator 13 is coupled electrically to the second differential amplifier 12 of the differential circuit 10, receives the third output voltage, and provides a control output signal corresponding to the third output voltage. It is noted that the integrator 13 converts the third output voltage, which is a square wave, to the control output signal, which is a triangular wave. As such, the DC motor 21 can be controlled with a high degree of precision and accuracy.

The current-limiting circuit 14 is coupled electrically to the DC motor 21, the integrator 13, and the current source 5. In this embodiment, the current-limiting circuit 14 receives the control output signal, and limits supply of the electric current from the current source 5 to the DC motor 21 in accordance with the control output signal for adjusting rotational speed of the DC motor 21. In particular, the current-limiting circuit 14 includes a variable impedance component, preferably a bipolar junction transistor (Q3). The transistor (Q3) has a base terminal 141 coupled to the integrator 13, a collector terminal 142 coupled to the current source 5, and an emitter terminal 143 coupled to the DC motor 21.

In operation, when the aperture setting unit 3 is set at a reference aperture such that the third output voltage of the second differential amplifier 12, which corresponds to the difference between the first and second output voltages, is not zero, the control output signal of the integrator 13 drives rotation of the DC motor 21. As the DC motor 21 rotates, the third output voltage approaches zero. Consequently, the rotational speed of the DC motor 21 is decelerated. When the DC motor 21 is rotated to an angular position corresponding to the reference aperture, that is, when the third output voltage is equal to zero, the current-limiting circuit 14 inhibits the supply of the electric current from the current source 5 to stop further rotation of the DC motor 21. Accordingly, the aperture 223 defined by the iris 22 is maintained at the reference aperture.

Figure 7:
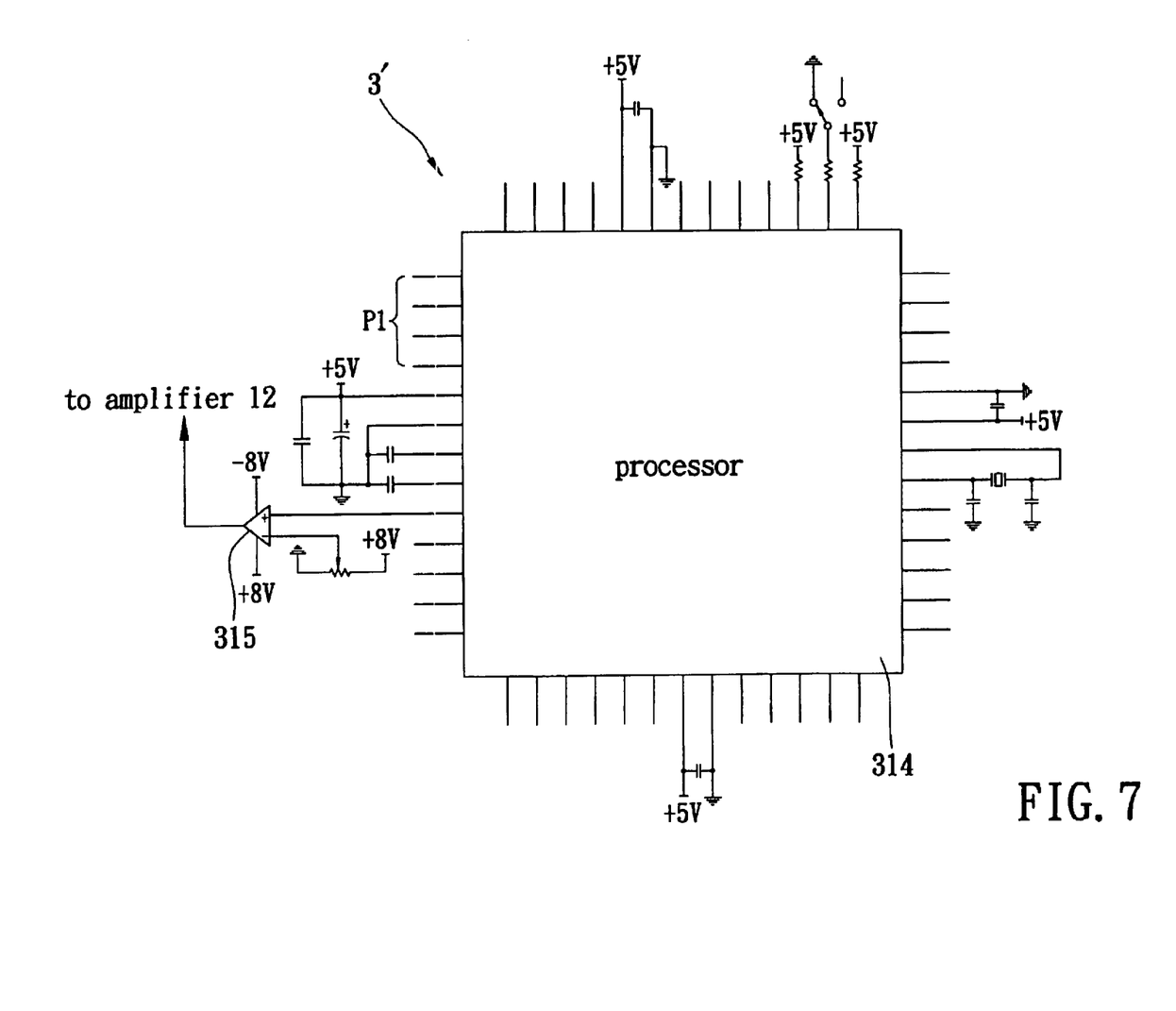
FIG. 7 is a schematic electrical circuit diagram of an aperture-setting unit of the second preferred embodiment of an adjustable iris-diaphragm controller according to the present invention.

Referring to FIG. 7, the aperture-setting unit 3' of the second preferred embodiment of an adjustable iris-diaphragm controller 100 according to the present invention is shown to include an automatically operated mechanism that includes a processor 314. In this embodiment, the processor 314 receives and processes an input brightness signal (P1), and provides an output signal that corresponds to the brightness signal (P1). The automatically operated mechanism further includes a differential amplifier 315 that is coupled to the processor 314 and the control module 1, that receives the output signal of the processor 314, and that provides an output voltage corresponding to the output signal of the processor 314. The output voltage of the differential amplifier 315 serves as the second output voltage.

It has thus been shown that the adjustable iris-diaphragm controller 100 of this invention includes a control module that is relatively inexpensive to implement and that permits the use of brushless DC motor 21 for accurate control of the aperture 223 defined by the iris 22.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An adjustable iris-diaphragm controller comprising:
   an aperture-defining unit including
      a brushless direct current (DC) motor, and
      an iris coupled to and associated operably with said DC motor for defining an aperture that corresponds to an angular position of said DC motor;
   a Hall sensor coupled to and associated operably with said DC motor so as to detect the angular position of said DC motor and to provide a first output voltage corresponding to the angular position detected thereby;
   an aperture-setting unit operable so as to set a reference aperture and to provide a second output voltage corresponding to the reference aperture;
   a current source for supplying electric current; and
   a control module including
      a differential circuit coupled electrically to said Hall sensor and said aperture-setting unit, said differential circuit receiving the first and second output voltages, and providing a third output voltage corresponding to the first and second output voltages,
      an integrator coupled electrically to said differential circuit, said integrator receiving the third output voltage and providing a control output signal corresponding to the third output voltage, and
      a current-limiting circuit coupled electrically to said DC motor, said integrator, and said current source, said current-limiting circuit receiving the control output signal, and limiting supply of the electric current from said current source to said DC motor in accordance with the control output signal for adjusting rotational speed of said DC motor,
   wherein when said DC motor is rotated to an angular position corresponding to the reference aperture, said current-limiting circuit inhibits the supply of the electric current from said current source to stop further rotation of said DC motor, thereby maintaining the aperture defined by said iris at the reference aperture.

2. The adjustable iris-diaphragm controller as claimed in claim 1, wherein said differential circuit includes a first differential amplifier coupled to said Hall sensor and operable so as to receive and amplify the first output voltage, and a second differential amplifier coupled to said first differential amplifier and said aperture-setting unit and operable so as to amplify a difference between the first output voltage amplified by said first differential amplifier and the second output voltage from said aperture-setting unit for producing the third output voltage.

3. The adjustable iris-diaphragm controller as claimed in claim 1, wherein said current-limiting circuit includes a variable impedance component.

4. The adjustable iris-diaphragm controller as claimed in claim 3, wherein said variable impedance component is a transistor.

5. The adjustable iris-diaphragm controller as claimed in claim 4, wherein said transistor has a first terminal coupled to said integrator, a second terminal coupled to said current source, and a third terminal coupled to said DC motor.

6. The adjustable iris-diaphragm controller as claimed in claim 1, wherein said aperture-setting unit is a manually operated mechanism that includes
   a voltage source,
   a plurality of resistors, each of which is coupled to said voltage source, has an electrical resistance distinct from those of the other ones of said resistors, and provides a corresponding voltage drop thereat, and
   a manually operable switch for coupling a selected one of said resistors to said control module so that the voltage drop at the selected one of said resistors serves as the second output voltage.

7. The adjustable iris-diaphragm controller as claimed in claim 1, wherein said aperture-setting unit is an automatically operated mechanism which includes a processor that receives and processes an input brightness signal to result in the second output voltage.

8. A control module for controlling an aperture-defining unit of an adjustable iris-diaphragm controller, the aperture-defining unit including a motor and an iris coupled to and associated operably with the motor to define an aperture that corresponds to an angular position of the motor, the adjustable iris-diaphragm controller including a Hall sensor coupled to and operably associated with the motor so as to detect the angular position of the motor and to provide a first output voltage corresponding to the angular position detected thereby, an aperture-setting unit operable so as to set a reference aperture and to provide a second output voltage corresponding to the reference aperture, and a current source for supplying electric current, said control module comprising:
   a differential circuit adapted to be coupled electrically to the Hall sensor and the aperture-setting unit so as to receive the first and second output voltages therefrom, said differential circuit providing a third output voltage in response to the first and second output voltage received thereby,
   an integrator coupled electrically to said differential circuit, said integrator receiving the third output voltage and providing a control output signal corresponding to the third output voltage, and
   a current-limiting circuit adapted to be coupled electrically to the motor and the current source, and coupled electrically to said integrator, said current-limiting circuit receiving the control output signal, and limiting supply of the electric current from the current source to the motor in accordance with the control output signal for adjusting rotational speed of the motor,
   whereby when the motor is rotated to an angular position corresponding to the reference aperture, said current-limiting circuit inhibits the supply of the electric current from the current source to stop further rotation of the motor, thereby maintaining the aperture defined by the iris at the reference aperture.

9. The control module as claimed in claim 8, wherein said differential circuit includes a first differential amplifier adapted to receive and amplify the first output voltage from the Hall sensor, and a second differential amplifier coupled to said first differential amplifier and operable so as to amplify a difference between the first output voltage amplified by said first differential amplifier and the second output voltage for producing the third output voltage.

10. The control module as claimed in claim 8, wherein said current-limiting circuit includes a variable impedance component.

11. The control module as claimed in claim 10, wherein said variable impedance component is a transistor.

12. The control module as claimed in claim 11, wherein said transistor has a first terminal coupled to said integrator, a second terminal adapted to be coupled to the current source, and a third terminal adapted to be coupled to the motor.

* * * * *